United States Patent Office 3,440,710
Patented Apr. 29, 1969

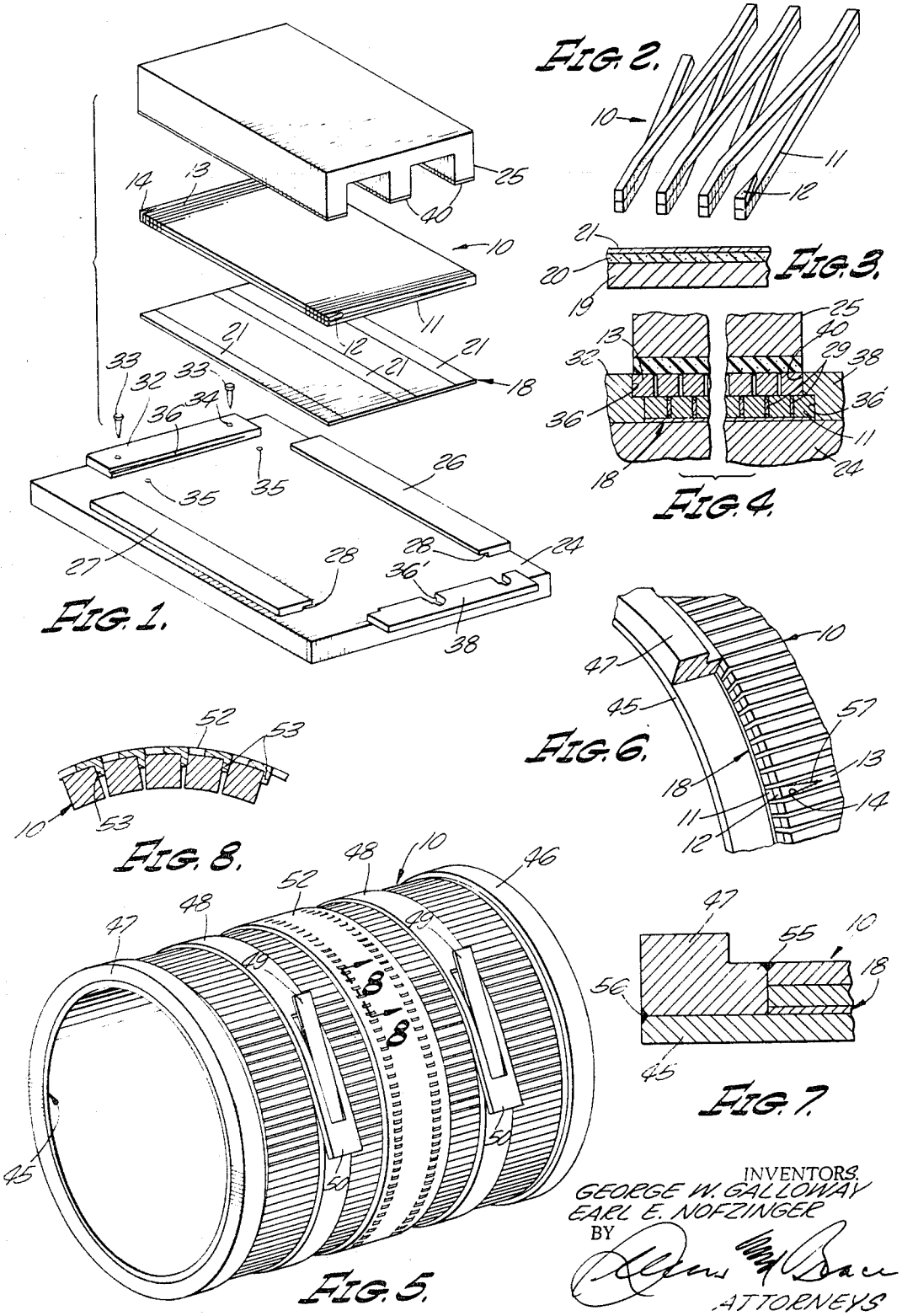

3,440,710
METHOD OF FABRICATING A CONTINUOUS ROD WARHEAD ASSEMBLY
George W. Galloway, Arcadia, and Earl E. Nofzinger, Azusa, Calif., assignors to G. W. Galloway Company, Baldwin Park, Calif., a corporation of California
Filed Nov. 30, 1966, Ser. No. 597,958
Int. Cl. B23k 31/02; B32b 31/00; F42b 13/00
U.S. Cl. 29—471.9                            15 Claims This invention relates to warhead assemblies and more particularly to an improved method of fabricating a continuous expandable rod-type warhead and to the improved article of manufacture provided by this improved technique.

A highly effective warhead comprises a double layered cylindrical blanket each layer of which is comprised of closely spaced rods of identical size and shape with the rods in one layer pitched slightly and oppositely to those in the other layer with the superimposed ends of adjacent rods overlapped and welded together to provide a single closed ring of rods connected together zig-zag fashion. A warhead of this type is disclosed in U.S. patent to Eugene L. Nooker, 3,160,099, granted Dec. 8, 1964.

The warhead of this invention utilizes the same general type of double-layered blanket belt but embodies numerous improvements including an improved assembly and an improved expeditious, inexpensive and highly uniform mode of fabricating such a warhead assembly. A feature of the assembly provided by the new assembly technique is an inner supporting main body comprising a thin-walled sleeve effective to restrain the explosive forces of the warhead until they have accumulated to a value effective to rupture the sleeve abruptly to expand the continuous rod assembly uniformly, powerfully and at a high rate. The proper and most effective functioning of such a warhead is critically dependent on such factors as the uniformity of the manufacturing technique, the uniformity of the welds between the rods and the uniform distribution of the rods relative to one another and the other components of the assembly.

Heretofore, the formation of the annular blanket of rods was a laborious time-consuming operation requiring complex jigs and clamping fixtures. Uniform spacing and distribution of internal stresses was extremely difficult if not impossible of achievement. Additionally, and importantly, there was lacking an adequate supporting structure for the welded rod subassembly prior to its assembly to other components and to the warhead proper.

It is therefore an important object of the present invention to provide an improved simplified mode of fabricating an expandable belt of zig-zag connected rods and an improved assembly avoiding the above-mentioned and other serious shortcomings of the prior assembly technique. In accordance with known practice in this art, the rods are arranged in two flat superimposed layers so pitched that the adjacent rods of the two layers may be welded together in zig-zag fashion. After a sufficient number of rods have been welded together, as described, to form a continuous ring of a desired size, but before forming this mat into a ring, the mat of rods is superimposed against a thin layer of adhesive carried by sheet buffer material having a width and a length corresponding to the dimensions desired for the mat of rods. This buffer and mat assembly is then placed on the platen of a press jig and jig components are pressed against the mat ends until its length corresponds with the length of the buffer pad. Thereafter a pressure plate is applied against the upper side of the mat as the adhesive is activated to fuse it against the lower surface of the mat until the adhesive takes a set. During this operation resilient spacer shims may be inserted between adjacent rods to assure their uniform spacing. Alternatively, the mat may be placed in a jig designed to compress the mat in the plane thereof while arching the mat sufficiently to provide the desired spacing between adjacent rods of the upper layer while securing this layer to the buffer subassembly.

The laminated assembly prepared according to either of these novel techniques is now ready to be rolled into a ring and to have the free ends of the rods in the upper and lower layers joined together about a metal sleeve. Thereafter, end rings are welded to the ends of the rods and these rings are welded or otherwise firmly secured to the adjacent ends of the sleeve to complete the assembly.

A feature of the final assembly operation is the use of tensioned hoops or bands applied to the exterior of the rods to make certain the rod assembly is contracted into pressure contact with the sleeve and that the rods are properly and uniformly contracted against the sleeve. Usually these tensioning hoops or bands are removed after final welding but they may comprise a permanent part of the assembly and may include inturned spacer shims for the rods of the outer layer.

Accordingly, it is a primary object of the present invention to provide an improved assembly for warheads featuring an expandable belt of zig-zag connected components.

Another object of the invention is the provision of an improved and more effective method of fabricating a warhead assembly characterized by its simplicity, the ease with which precision and uniformity is achieved and the reliability and quality of the finished product.

Another object of the invention is the provision of an improved mode of fabricating a warhead unit in which a zig-zag welded mat of rods are held uniformly spaced by lamination to a thin flexible buffer assembly so that the unit can be safely handled and manipulated during later phases of manufacture.

Another object of the invention is the provision of a simplified method of holding a layered mat of zig-zag connected rods uniformly spaced while anchoring them so spaced to facilitate assembly of the mat into a ring.

Another object of the invention is the provision of an improved mode of simultaneously and uniformly spacing one layer of zig-zag connected rods by arching one layer over a compactly compressed second layer.

These and other more specific objects will appear upon reading the following specification and claims and upon considering in connection therewith the attached drawing to which they relate.

Referring now to the drawing in which a preferred embodiment of the invention is illustrated.

FIGURE 1 is an exploded isometric view of the lamination components for the invention warhead and of components of the laminating jig;

FIGURE 2 is a fragmentary perspective view of the rod mat and showing the rods partially expanded;

FIGURE 3 is a fragmentary cross-sectional view on an enlarged scale showing components of the flexible buffer pad;

FIGURE 4 is a fragmentary cross-sectional view on enlarged scale through the assembly jig during the laminating operation;

FIGURE 5 is a perspective view of the invention unit while undergoing assembly to a supporting sleeve and end rings;

FIGURE 6 is a fragmentary view partly in section of one end of FIGURE 5;

FIGURE 7 is a fragmentary axial sectional view through one end of the final assembly;

FIGURE 8 is a fragmentary cross-sectional view taken along line 8—8 on FIGURE 5.

Figure 9:
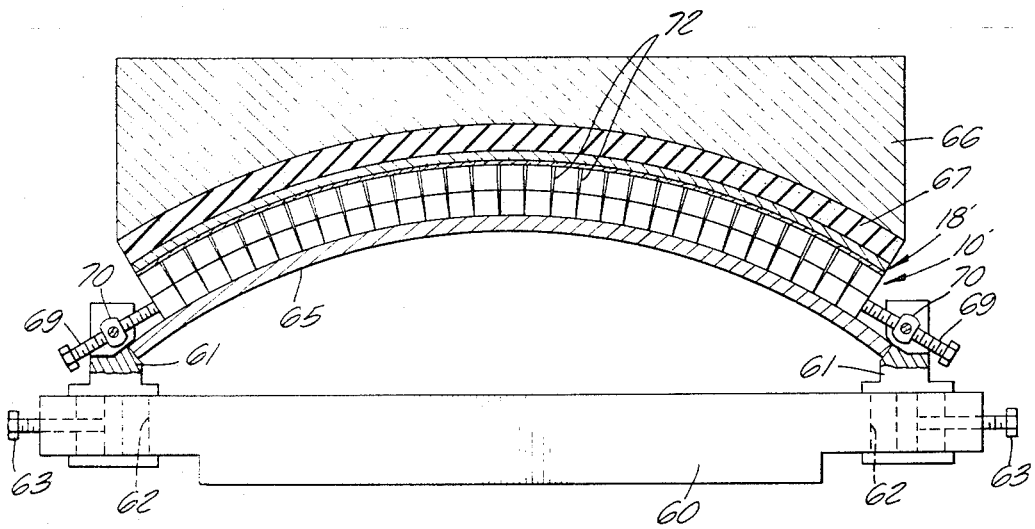
FIGURE 9 is an end view of the rod subassembly undergoing assembly to the buffer unit in an alternate jig unit.

Referring initially more particularly to FIGURES 1 and 2, there is illustrated an early step in constructing a continuous rod warhead in accordance with one preferred mode utilizing principles of the present invention. A multiplicity of straight rods of identical size and shape are arranged in two layers and welded together zig-zag fashion in the manner well known to those skilled in this art and illustrated in FIGURE 2. However, it will be understood that in FIGURE 2 the individual rods are separated sufficiently to facilitate welding. It is pointed out that the welding operation is preferably performed while a multiplicity of straight rods of identical size and shape are arranged in side-by-side relation in two layers with the rods in the two layers lying at a slight angle to one another such that the opposite ends of the two layers can be welded together in the zig-zag fashion illustrated in FIGURE 2. Desirably, the rods are of square cross-section and the end of an upper layer rod directly overlies and is welded to the underlying end of the next adjacent rod in the lower layer. Resistance welding technique or other suitable mode of electric welding is employed to provide a flat unitary mat of rods designated generally 10. The welds between the overlapped ends of the rods are of the same general character described in the patent to E. L. Nooker, 3,160,099, referred to above. To facilitate joining the mat ends into a ring, the first rod 11 of the lower layer preferably has welded to its upper end a triangular shaped section 12, whereas the free end of the last rod 13 in the upper layer is provided with a notch 14 complemental in shape to block 12.

From the foregoing description of the mode of assembling mat 10, it will be evident that it is a simple matter to control the assembly operation of the mat and to assure high accuracy and uniformity of spacing between the rod ends and to carry out the welding operation without stress or strain in any part of the assembly. Likewise, it is a relatively simple matter to fabricate a mat assembly 10 with the rod ends lying in common transverse planes through their opposite ends and with all rods in one layer inclined identically to the rods in the lower layer.

The next step in the assembly operation is to laminate mat 10 to a buffer assembly designated generally 18. This buffer assembly, illustrated in exaggerated thickness in FIGURE 3, includes a high strength but flexible main body layer 19 of either metallic or non-metallic material, as a suitable thermoplastic, for example, cellulose acetate, having bonded thereto a layer of strong adhesive 20 and preferably either sheet or strip adhesive material 21. As shown herein, the upper layer comprises a plurality of strips 21 extending lengthwise of the buffer assembly and distributed as illustrated. Adhesive material 20, 21 may be activated either by heat or chemical solvent such as alcohol or acetone. A heat sensitive type is somewhat more convenient to handle and control but either type may be used. If sheet 19 is of thermoplastic material then it is preferable that adhesive layer 21 have a low setting temperature, as 125° F., and that it have a composition which is compatible with the constituents of sheet 19 and of adhesive film 20. The size of the buffer is of importance, its width corresponding to the width of mat 10 and its length corresponding to the inner girth of the mat assembly when wrapped into a ring in the final assembly illustrated in FIGURE 5, it being the purpose of buffer 18 to hold the mat rods accurately spaced while being handled, wrapped and welded to the final ring assembly.

Assembly of mat 10 and buffer assembly 18 is accomplished by the jig components illustrated in FIGURE 1 which includes a lower pressure plate 24 and an upper pressure plate 25. Lower plate 24 is provided with guide strips 26, 27 suitably adjustably clamped parallel to one another along the opposite sides with their adjacent inner edges parallel to one another and spaced to have a close sliding fit with the ends of the upper layer of rods in mat 10. Preferably, strips 26, 27 are recessed as indicated at 28 to accommodate the protruding ends of shims 29 (FIGURE 4) sometimes used between the ends of the rods. These shims are of soft or resilient material and may be embossed with serrations or corrugations which crush down as the rods are forced together lengthwise of the mat in a manner which will be described in more detail presently. The ends of the shims preferably project beyond the ends of the rods into recesses 28 and enable the shims to be grasped by tools for withdrawal after the rods have been laminated to buffer 18.

A third jig positioning strip 32 is held removably supported across one end of pressure plate 24 by dowel pins 33 extending through openings 34 into openings 35 in plate 24. The inner edge of strip 32 has a triangular recess 36 extending therealong sized to accommodate the upper end rod 13 of mat 10. A similar triangular recess 36 is formed along the inner lower edge of strip 38 to accommodate end rod 11 of the lower layer. It will be understood that strip 38 is connected to a suitable power means, not shown such as a hydraulic cylinder, arranged to move this strip toward and away from its companion clamping strip 32 for the purpose of compressing the rods in mat 10 accurately to a desired length of the mat.

The lamination of buffer unit 18 to mat 10 is accomplished by placing the buffer unit against the upper face of plate 24 with the adhesive material facing upwardly, this assembly usually being accomplished while strip 32 is detached. This permits the buffer pad and the mat to slide as a unit into position beneath the overhanging edges of strips 26 and 27. If desired, this operation is facilitated by loosening and slightly retracting strip 27 and reclamping it in its proper position after the mat is in position. Strip 32 is then returned to its assembly positon and the power operator for strip 38 is activated to apply pressure lengthwise of mat 10 until it has been contracted exactly to its desired prescribed length corresponding to the length of buffer assembly 18. Thereafter, pressure plate 25 is lowered against the top of mat 10 with the resilient pads 40 bearing against the top layer of rods in the mat. Heat is then applied to the adhesive material 20, 21 through plate 24 causing the adhesive to fuse and become bonded to the lower side of the mat as the adhesive takes a set.

Pressure plate 25 and strip 38 are now retracted; dowels 33 are removed and the laminated assembly is withdrawn lengthwise from the left-hand end of plate 24. If shim strips 29 have been used to hold the rods of the lower layer spaced apart, these are withdrawn from the ends of the mat leaving the laminated assembly ready to be rolled into a ring. The laminated structure may be handled freely at this time since the buffer assembly is firmly bonded to the lower layer of rods and serves to hold all rods accurately and firmly spaced.

The next step is to mate the triangular block 12 with the similarly shaped notch 14 in the free end of rod 13. This may be accomplished by shifting the opposite ends of the mat axially apart until the pointed end of block 12 can be inserted in notch 14 and can be performed either while the laminated unit is wrapped about metal sleeve 45 or before. In the latter case, the assembled ring is telescoped over one end of sleeve 45. It will also be understood that, if desired, the opposite ends of the mat assembly may be interlocked and welded together after being wrapped about sleeve 45.

Sleeve 45 is accurately dimensioned and has a snug sliding fit with the interior of buffer 18. Desirably, sleeve 45 is somewhat longer than the rod assembly to provide room for a pair of end rings 46, 47. These rings have a rather massive cross section and serve to reinforce the opposite ends of the sleeve.

Before proceeding to weld the components together it is desirable that the laminated assembly be contracted into firm pressure contact with sleeve 45. This is preferably accomplished by applying tensioning hoops or bands 48 about the ring of rods and then tensioning these by applying traction to their opposite ends 49, 50. This operation sometimes has a tendency to spread the rods more in one portion of the assembly than in another, a result which can be safeguarded against by first applying a band 52 about the assembly having spacer shim tangs 53 struck inwardly therefrom at uniform intervals and sized to provide the desired proper spacing between adjacent rods of the outer layer. Once this band has been properly assembled about rods, tension may be applied to hoops 48, 48 to contact the laminated ring against sleeve 45.

The ends of the rods in the outer layer of rods in mat 10 are then welded or brazed to the adjacent rim edges of rings 46, 47 as indicated at 55 in FIGURE 7. Finally, the end rings 46, 47 may be suitably secured to sleeve 45, as by welds 56. The mating edges of block 12 and notch 14 are also welded together as indicated at 57 in FIGURE 6.

Tensioning hoops 48 may now be removed and so may the shim band 52. The completed continuous rod warhead assembly is now in readiness for assembly about a projectile, bomb, missile or other high-explosive component.

Referring now to FIGURE 9, there is shown a second preferred embodiment and mode of assembling mat 10′ to the buffer subassembly 18′, it being understood that each of these subassemblies corresponds with the above described construction of each. The jig employed in joining subassemblies 10′ and 18′ includes a rigid flat surfaced platen 60 having adjustable clamping members 61 slidably supported in slots 62 of the platen and adjustable toward one another by clamping screws. Initially clamping members 61 are retracted so that the resilient metal plate 65 lies generally flat against the upper side of the platen. At this time, a pressure plate 66 corresponding generally to pressure plate 25 is retracted upwardly along with its attached resilient pressure pad 67.

The jig now being ready for use, the previously prepared mat assembly 10′ of welded rods is positioned on the upper side of the flexible plate 65 between the pressure-applying screws 69. The latter screws are mounted swivelly in trunnion nuts 70 pivotally supported in the bifurcated upper end of clamping members 61. As clamping screws 69 are tightened toward one another against the adjacent end rods in the lower layer of mat 10′, this layer is contracted until all rods are in intimate contact. Thereafter, buffer unit assembly 18′ is placed against the upper side of the other row of rods, it being understood that buffer 18′ is of the same type and construction described above with the adhesive layer facing downwardly and the attached buffer sheet facing upwardly against the underside of the resilient pressure pad 67. Thereafter, clamping screws 63 are adjusted toward one another to apply edgewise pressure to the opposite ends of flexible plate 65 causing this plate to arch upwardly. During this arching operation, screws 69 are also adjusted as necessary to keep the lowermost lateral corners of the lower layer of rods in close contact with one another while permitting the adjacent lateral sides of the rods in the upper layer to open narrow wedge-shaped gaps 72 therebetween.

The pressure plate 67 is in pressure contact with buffer assembly 18′ and the arched mat assembly during this final stage of the arching operation and the adhesive in the buffer assembly is activated by heat or chemical action to bond the buffer assembly intimately and firmly to the underlying surface of the mat assembly. The parts are held under pressure in this position until the adhesive takes a firm set. Thereafter, the clamping screws are retracted and the pressure plate is retracted so that the inter-joined buffer and mat assembly can be removed and assembled to cylinder 45 and end rings 46, 47 in the same manner described above in connection with the first described embodiment of the invention.

As will be appreciated from the foregoing, no spacer shims are necessary when practicing the assembly technique illustrated in FIGURE 9 and the adjacent pairs of rods open automatically and uniformly from end-to-end of the mat as the mat is arched upwardly with compressive pressure applied to the opposite ends of the mat along the exposed sides of the end rods in the lower layer.

In use, sleeve 45 withstands the force of the explosive for a short interval of time until this pressure has developed to a desired bursting pressure whereupon the portion of the sleeve between the strong end rings 46, 47 suddenly fails abruptly along with the relative thin low-strength buffer assembly 18. Thereupon the explosive forces are effective to expand rod blanket 10 to many times its assembled size before the welds on the rods fail and the blanket fragments into many parts.

While the particular method of fabricating a continuous rod warhead assembly and the article provided thereby herein shown and disclosed in detail is fully capable of attaining the objects and providing the advantages hereinabove stated, it is to be understood that it is merely illustrative of the presently preferred embodiments of the invention and that no limitations are intended to the details of construction or design herein shown other than as defined in the appended claims.

We claim:

1. That method of fabricating a warhead assembly which includes: placing a thin flexible buffer pad on a base plate which unit has strong adhesive material applied to the surface thereof, placing said strong adhesive against one face of a double layer mat of rods with the rod ends of adjacent rods in the two layers welded together zig-zag fashion to form a one-piece mat, holding the rods in at least one of said layers uniformly compacted within a predetermined distance extending transversely of said rods which distance is generally coextensive with the length of said buffer pad, pressing said mat of rods against said adhesive until the same takes a set to bond said rods to said buffer pad to laminate said mat of rods thereto with the rods held firmly in place thereon.

2. That method defined in claim 1 characterized in the step of activating said adhesive to soften the same preliminary to applying pressure between said base plate and said mat of rods.

3. That method defined in claim 1 characterized in the step of applying heat to activate said adhesive while pressing said mat of rods against the activated adhesive.

4. That method defined in claim 1 characterized in the step of temporarily inserting compressible spacers between the ends of adjacent rods in one of said layers to facilitate holding said rods uniformly distributed in each layer thereof while being bonded to the adhesive on said buffer pad.

5. That method defined in claim 1 characterized in the step of forming a ring assembly of said laminated buffer pad and mat of rods and rigidly connecting the free end of the last rod in the upper layer to the free end of the last rod in the lower layer.

6. That method defined in claim 5 characterized in the step of snugly pressing said laminated ring assembly against the exterior of a metal sleeve having a length at least as great as the axial length of said ring assembly, applying metal rings against the opposite ends of said mat of rods, welding said rings to the adjacent ends of said mat of rods, and securing said rings to said sleeve.

7. That method defined in claim 5 characterized in the steps of tensioning hoops about the exterior of said ring assembly to contract the same snugly against the exterior of a metal sleeve having its opposite ends protruding slightly beyond the opposite ends of said mat of rods, applying snug fitting end rings over the ends of said metal sleeve, bonding the ends of rods in the outer layer of said mat to the inner edge of the adjacent end ring, and welding each of said end rings to the adjacent end of said metal sleeve.

8. That method defined in claim 7 characterized in the steps of removing said tensioning hoops after making said rod and end ring welds.

9. That method defined in claim 1 characterized in the step of compressing the rods of one layer of said mat against one another and arching said compressed mat lengthwise thereof to open slight gaps between adjacent pairs of rods in the other layer thereof against the outer faces of which said adhesive material is pressed.

10. That method defined in claim 9 characterized in that pressure forcing said flexible buffer pad is applied uniformly thereto to force said adhesive against all rods in contact with said adhesive.

11. That method of fabricating a warhead assembly adapted to be assembled into a continuous ring which comprises the steps of superimposing two flat layers of identical rods against one another with the rods in one layer pitched oppositely to those in the other layer sufficiently for adjacent upper and lower rod ends in the two layers to be secured together to form a single mat of zig-zag connected rods, welding said adjacent rod ends together, and laminating said unitary mat of welded rods to a flexible sheet of material to hold said rods in a desired predetermined relation to one another while being handled and formed into a continuous ring.

12. That method defined in claim 11 characterized in the step of cutting said flexible sheet to a length corresponding to the internal diameter of the continuous ring to be formed from said unitary mat of welded rods, superimposing said flexible sheet and unitary mat of rods against intervening adhesive material, compressing said mat of rods in the plane thereof crosswise of the rods until the length of said mat corresponds with the length of said flexible sheet while laminating said mat of rods to said flexible sheet with said adhesive material.

13. That method defined in claim 12 characterized in rolling said laminated assembly into a ring and securely and rigidly joining the free ends of the rods of said mat together into a single ring of rods all connected together in end-to-end relation and held in predetermined spaced relation by said flexible sheet bonded to the inner layer of said rods.

14. That method of holding a two-layered mat of zig-zag connected rods uniformly and flexibly interconnected which method comprises: placing one face of said mat against a flexible plate with the layer next to said plate pressed against one another, arching said plate lengthwise of said mat thereby opening a slight wedge-shaped gap between adjacent rods of the other of said layers, and bonding thin flexible material crosswise of the exposed face of the rods in said second layer.

15. That method of holding a two-layered mat of zig-zag connected rods uniformly and flexibly interconnected which method comprises: compressing the rods of one layer of said mat against one another while supported crosswise of an arched supporting surface and allowing the rods of the other layer remote from said supporting surface to open small wedge-shaped gaps therebetween of substantially uniform size, and bonding flexible sheet material across the exposed faces of said last mentioned layer to lock said rods flexibly in closely spaced relation.

References Cited
UNITED STATES PATENTS

| | | | |
|---|---|---|---|
| 2,027,847 | 1/1936 | Victor et al. | 161—111 |
| 2,051,373 | 8/1936 | Fitzgerald | 161—111 X |
| 2,733,177 | 1/1956 | Meyer | 161—111 X |
| 3,160,099 | 12/1964 | Nooker | 102—67 |
| 3,224,371 | 12/1965 | Kempton et al. | 102—67 |
| 3,298,308 | 1/1967 | Throner | 102—67 |

JOHN F. CAMPBELL, *Primary Examiner.*

J. L. CLINE, *Assistant Examiner.*

U.S. Cl. X.R.

29—471.1; 102—67; 156—229; 161—111